US007712093B1

(12) United States Patent
Foley

(10) Patent No.: US 7,712,093 B1
(45) Date of Patent: May 4, 2010

(54) DETERMINING INTRA-PROCEDURAL OBJECT FLOW USING ENHANCED STACKMAPS

(75) Inventor: Sean C. Foley, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/407,758

(22) Filed: Mar. 19, 2009

(51) Int. Cl.
*G06F 9/45* (2006.01)
*G06F 9/44* (2006.01)

(52) U.S. Cl. ...................................... 717/155; 717/131

(58) Field of Classification Search .......... 717/152–155
See application file for complete search history.

(56) References Cited

U.S. PATENT DOCUMENTS

| | | | |
|---|---|---|---|
| 6,014,723 | A | 1/2000 | Tremblay et al. |
| 6,026,485 | A | 2/2000 | O'Connor et al. |
| 6,158,048 | A | 12/2000 | Lueh et al. |
| 6,381,738 | B1 | 4/2002 | Choi et al. |
| 6,675,379 | B1 * | 1/2004 | Kolodner et al. ............ 717/155 |
| 6,681,385 | B1 | 1/2004 | Steensgaard et al. |
| 7,111,294 | B2 | 9/2006 | Steensgaard |
| 7,168,071 | B2 | 1/2007 | Wu et al. |
| 7,203,833 | B1 | 4/2007 | Abadi et al. |
| 7,213,233 | B1 | 5/2007 | Vinodkrishnan et al. |
| 7,240,244 | B2 | 7/2007 | Teegan et al. |
| 7,475,214 | B2 | 1/2009 | Hwang |
| 7,496,894 | B2 | 2/2009 | Das |
| 7,500,232 | B2 | 3/2009 | Das et al. |
| 7,603,662 | B2 * | 10/2009 | Rajaram et al. ............. 717/146 |
| 2002/0138825 | A1 * | 9/2002 | Heeb .......................... 717/148 |
| 2003/0079210 | A1 * | 4/2003 | Markstein et al. ........... 717/152 |
| 2006/0026563 | A1 | 2/2006 | Cabillic |
| 2006/0026566 | A1 | 2/2006 | Cabillic et al. |
| 2006/0143596 | A1 | 6/2006 | Miyashita et al. |
| 2007/0143743 | A1 | 6/2007 | Cobb et al. |

(Continued)

FOREIGN PATENT DOCUMENTS

CA      2593883      1/2008

OTHER PUBLICATIONS

Ruf, Erik, "Effective Synchronization Removal for Java", slide presentation presented at Conference on Programming Language Design and Implementation, Jun. 18-21, 2000, Vancouver, BC, Canada.

(Continued)

*Primary Examiner*—James Rutten
(74) *Attorney, Agent, or Firm*—Leveque Intellectual Property Law, P.C.

(57) ABSTRACT

Analysis of object flow during execution of individual instructions of a method within an object-oriented application provides information regarding the creation and flow of objects during an invocation of the method. This analysis information is used to track where objects enter an invocation of the method and track their path during the execution of the method. The operand stack, register, and local variables references to the objects are tracked as each instruction in the method is executed. Where objects are passed to elements outside of the method invocation is tracked as well. This tracking of object flow uses an iterative data-flow analysis. If an object is passed to the method or created within the method, the embodiments described herein may be used to determine where that object can go from that point onwards, whether to other method invocations, arrays, or data fields within the application.

1 Claim, 2 Drawing Sheets

U.S. PATENT DOCUMENTS

2007/0220492 A1 9/2007 Brugiolo et al.
2009/0055806 A1 2/2009 Tang
2009/0064099 A1 3/2009 Foley

OTHER PUBLICATIONS

Wang, L. et al., "Escape Analysis for Synchronization Removal", Proceedings of the 2006 ACM Symposium on Applied Computing, pp. 1419-1423, Apr. 23-27, 2006.

Nielsen, U.H. et al., Escape Analysis in the Jikes RVM, Project Report, May 27, 2003, URL: http://mads.danguah.dk/projekter/6sem/twoside/jikes_twoside.pdf.

Goetz, B., "Java Theory and Practice: Urban Performance Legends, Revisisted", IBM Devloperworks, Sep. 27, 2005, URL: http://www.ibm.com/developerworks/java/library/j-jtp09275.html.

Love, M., "Optimized Java", Dr. Dobb's Portal, Jun. 1, 2006, URL: http://www.ddj.com/java/188700760.

Zeigler, S. et al., Ada for the Intel 432 Microcomputer, IEEE computer vol. 14 No. 6, pp. 47-56, Jun. 1, 1981.

Veldma et al., Supporting Huge Address Spaces in a Virtual Machine for Java on a Cluster, Languages and Compilers for Paralllel Computing: $20^{th}$ International Workshop, LCPC 2007, Urbana, IL, Oct. 11-13, 2007, pp. 187-201.

Rinard, M. et al., A Classification System and Analysis for Aspect-Oriented Programs, SOGSOFT '04/FSE-12, Oct. 21-Nov. 6, 2004, Newport Beach, CA.

Choi, J.et al., Stack Allocation and Synchronization Optimizations for Java Using Escape Analysis, ACM Transactions on Programming Languages and Systems (TOPLAS), vol. 25, Issue 6, Nov. 2003, pp. 876-910.

Bogda, J. et al., Can a Shape Analysis Work at Run-Time?, Proceddings of the Java Virtual Machine Research and Technology symposium (JVM '01), Apr. 23-24, 2001, Monterey, CA.

Floey S., From Global to Local Escape Analysis in Java, SIGPLAN '05, Jun. 12-15, 2005.

Kotzmann, T. et al., Escape Analysis in the Context of Dynamic Compilation and Deoptimization, ACM/USENIX International Conference on Virtual Execution Environments, pp. 111-120, VEE '05, Jun. 11-12, 2005, Chicago, IL.

Lee, K. et al. A Two-Phase Escape Analysis for Parallel Java Programs, PACT '06, Sep. 16-20, 2006, Seattle, WA.

* cited by examiner

DETERMINING INTRA-PROCEDURAL OBJECT FLOW USING ENHANCED STACKMAPS

CROSS-REFERENCE TO RELATED APPLICATIONS

The present is related to Ser. No. 12/407,755, GLOBAL ESCAPE ANALYSIS USING INSTANTIATED TYPE ANALYSIS, filed on even date herewith.

BACKGROUND

It is known that object-oriented software applications, such as those using Java™, C++ and C# or other object-oriented programming languages, consist of classes, each which contain methods, also known as functional members, or functions, that contain the instructions to run an application as well as data members or fields. Classes are "instantiated" in order to create objects. Each object contains its own set of data as specified by the data members of the class, and the functional members of any given object are capable of acting on the data members of the object. Objects can be passed into a method invocation in a variety of ways. In Java™, for example, object entries can be accomplished in the following ways: as method arguments or method signature parameters (including the "this" object as a hidden parameter for a non-static method), as field reads, as reads from array object elements, as objects returned form invoked methods, and as exception objects caught from invoked methods throwing the exception objects. Objects can be created within a method by an object creation instruction. Objects can be passed out of a method invocation in a number of ways; objects that are present during a method invocation are stored on the operand stack (Java™), in registers (non-Java™), and in local variables. The references and pointers to objects may change locations as each instruction is executed within a method.

As the instructions of a method are executed, objects are passed to/from different locations in a number of ways, such as by method invocation (stack, locals, registers), by passing to other method invocations, object fields, array elements, and other elements within the running application.

Determining the possible paths that objects may follow inside a method invocation prior to runtime is often required for various processes within an object-oriented software application, and for various optimizations to the software application. This information can be used for various purposes. One use is to incorporate this information within control flow analysis to determine which elements of a software application are reachable. Eliminating unused elements results in less memory usage on the file system and at runtime, and also provides performance improvements. Another use is to incorporate this information with escape analysis, which determines those objects that remain reachable after a method invocation has completed. Escape analysis allows compilers or virtual machines to remove locks, to make memory use more efficient by allocating objects on the stack (making collection automatic, rather than relying on garbage collection), and to apply other optimizations to an application.

BRIEF SUMMARY

In accordance with embodiments consistent with the present invention, analysis of object flow during execution of individual instructions of a method provides information regarding the creation and flow of objects during a method invocation of an object-oriented application. This information is used to track where objects may enter an invocation and track their path throughout the stack and local variables during execution of the instructions of a method (function). The operand stack, register, and local variables references to the objects are tracked as each instruction in the method is executed. Where objects are passed to elements outside of the method invocation is tracked as well. If an object enters a method invocation or is created within a method invocation, the embodiments described herein may be used to determine where that object can go from that point onwards. This tracking of object flow is not a trivial advancement in the art and requires an iterative data-flow analysis.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Determining intra-procedural object flow using enhanced stackmaps, in accordance with the embodiments presented herein, means that for each instruction of a method a representation for the state of the local variables of a local variable array and an operand stack at that instruction is used, and the state includes the set of objects that can exist at each stack and local variable location as will be described. The objects are created as representations of objects at runtime and are referred to as object representations. Each object representation that is created will record the instruction or the parameter that cause the object to be created. In this way, objects will "remember" where they originated, no matter where a reference to the same object may be found.

Figure 1:
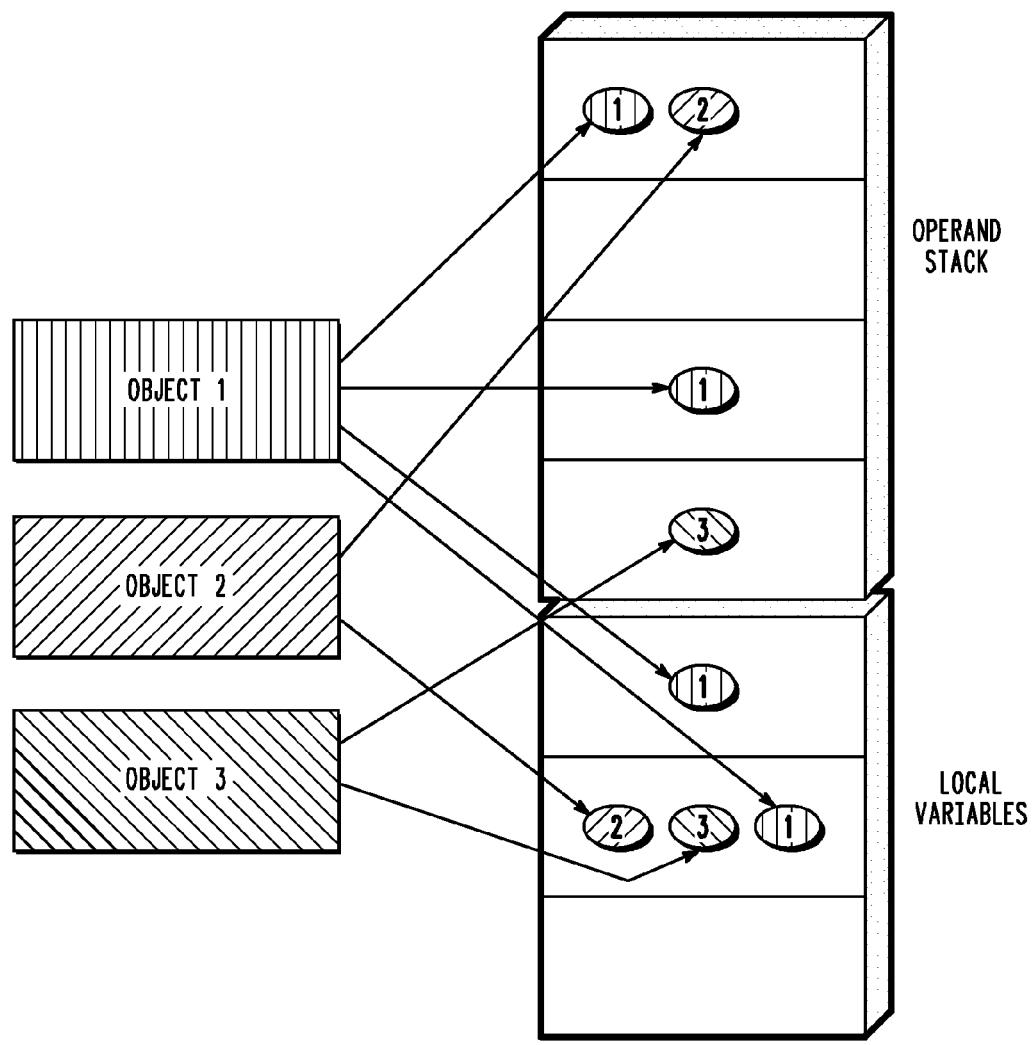
FIG. 1 is a block diagram that illustrates the relationship between objects and the local variable array and operand stack, in accordance with various embodiments disclosed herein.

The objects described herein correspond to the locations where objects can enter the method and the locations where objects can be created within the method. The methodology will visit the instructions and populate the operand stack and local variables for each instruction, and repeat this iteratively until the states of the stack and locals at each instruction has been determined and converged, regardless of what path is taken to reach each instruction. Referring to the block diagram of FIG. 1, three objects, Object 1, Object 2 and Object 3, are shown as object representations in both the Operand Stack and the Local Variables array. These objects will later be discussed further in connection with FIG. 2 below. While it will be noted that many of the examples given herein reflect a Java™ implementation, and thus exhibit a Java-centric use of terminology and specifics, the metes and bounds of the several embodiments are applicable to any object-oriented programming language, such as C++ or C#.

The objects created for an intra-procedural object flow analysis correspond to each of the locations where objects can enter a method. Unlike the objects described in the Java™ virtual machine specification, objects as used herein contain no data fields, and do not represent just a single class type, as it is the reference type of the object, not the type of object, that is represented by the object representation. For each location where objects can enter the invocation, a single object representation represents the set of all objects that may be introduced at the corresponding location, whether that location is a stack location at a particular instruction of the method (for objects returned or caught or loaded from arrays) or a method parameter (for objects passed as method arguments). Each element of the operand stack and the local variable array contains a set, and this set eventually contains all objects known to occupy that stack or local slot.

As discussed previously, an object may be introduced or created as an argument to the method (method argument), an object loaded from a field (a field read) or an array (an array element load), an object returned from a method invocation, an object caught by an exception handler, an object instantiated within the method itself (newly instantiated object), an object created at runtime (in the Java™ language, for example, there are four instructions that create objects: 'newarray', 'anewarray', 'multianewarray' and 'new').

Data flow analysis tracks all objects through the code of the method. An iterative procedure visits the instructions and populates the operand stack and local variables array for each instruction, starting with the first instruction of the method. If a local or stack item remains unchanged by a given instruction, then the corresponding slot following that instruction maintains the same collection of objects. Otherwise, the instruction itself determines how the contents of the slot may change. When a local or stack slot is merged with another due to the control flow of the method being merged (an instruction can be reached directly from two or more separate instructions), the collection of objects in each merged slot holds all objects contained in each merging slot.

As a result of the analysis, a collection of stacks and local variable arrays are obtained, with each stack and local slot containing a set of objects. Furthermore, each object is linked to the instruction where the object was introduced. These resulting data structures are considered stack maps: representations of the operand stacks and the local variables at each instruction executed.

In accordance with embodiments consistent with the present invention, analysis of object flow during execution of individual instructions of a method is provided. For each instruction of a plurality of instructions of an invoked method of an object-oriented application, the effect of each instruction on a local variable array and an operand stack is modeled. Such modeling includes determining a representation for the state of a plurality of local variables of a local variable array and of an operand stack at a current instruction of the plurality of instructions, wherein the state comprises a set of objects permitted to exist at each operand stack slot of a plurality of operand stack slots of the operand stack and at each local variable slot of a plurality of local variable slots of the local variable array for the current instruction; determining successor instructions of the plurality of instructions that can follow the current instruction; and following execution of the current instruction, merging the state of the representation of the operand stack and the local variable array into each of the successor instructions, wherein if a successor instruction of the plurality of successor instructions has been previously executed further comprising merging the set of objects of the current instruction with the set of objects of the successor instruction to create a merged set of objects of the successor instruction.

With regard to modeling the effects of an instruction, consider the following Java-specific examples, by way of illustration and not limitation. The object set for the local variable array will exactly match the object set of the stack location from which the local variable was populated in the case where an instruction modifies a local variable and it is recorded that the local variable now contains the new type.

If an instruction creates objects to be placed on the stack (newarray, anewarray, multianewarray, new) then an object representation (multiple object representations in the case of multianewarray) is created that is uniquely identifiable as the object generated by that single instruction. The top stack location will contain an object set whose sole element is the new object representation.

If an instruction invokes a method that returns objects, an object representation whose type matches the return type is created and added as the sole element for the object set of the top stack element.

If an instruction reads from a field, an object representation whose type matches the field type is created and added as the sole element for the object set of the top stack element.

If an instruction is the first instruction of an exception handler, an object representation that matches the given exception handler's catch type is created and added as the sole element for the object set of the top stack element. For handlers that catch all object types, an object of type java.lang.Object is created. It is noted that for languages other than Java™, the base type which is common to all objects, or a pseudo-type representing all objects, may be used.

Consider further an example in which a field read in Java™ places an object on top of the operand stack. In accordance with the various embodiments presented herein, an object whose type matches the type of the field is created. The operand stack representation corresponding to the stack prior to the successor instruction is created, if not previously created. Then, the created object is added to the set of objects correspondingly owned by the top stack slot. All other local variable and stack locations are updated to contain sets of objects that match exactly the object sets at the corresponding locations prior to execution of the instruction.

With regard to merging the state of the operand stack and local variable array at the end of the execution of the current instruction into each of its successor instructions, consider that if the successor instruction has been seen before, the operand stack and local variable values previously calculated are merged into the values already there and a "changed" flag is set if there is any modification to the values, so that the iterative process will know to repeat itself on the successor instruction. The object sets corresponding to each merged local variable and stack location are also merged. This changed flag is set if any of the merged object sets differ from (are larger than) any of the pre-existing object sets in any operand stack location or local variable of the successor instruction.

To merge two object sets, either in the local variable array or on the operand stack, the object sets corresponding to pairs of stack locations or local variables are compared to create a new object set. The new object set will contain a single reference to any object present within either of the merged sets. A single set may contain numerous objects of various different object types, or numerous objects of the same types. Note that it is not the object types that are compared, but rather the object identities.

This modeling is iteratively repeated for each instruction of the plurality of instructions on the local variable array and the operand stack until the states of the local variable array and the operand stack at each instruction of the plurality of instructions converge. For each set of objects that exist at each operand stack slot of the plurality of operand stack slots of the operand stack and for each set of objects that exists at each local variable slot of the plurality of local variable slots of the local variable array when the states of the local variable array and the operand stack converge, an object of the set of objects maintains a map to an instruction of the plurality of instructions where the object was introduced to the method.

Figure 2:
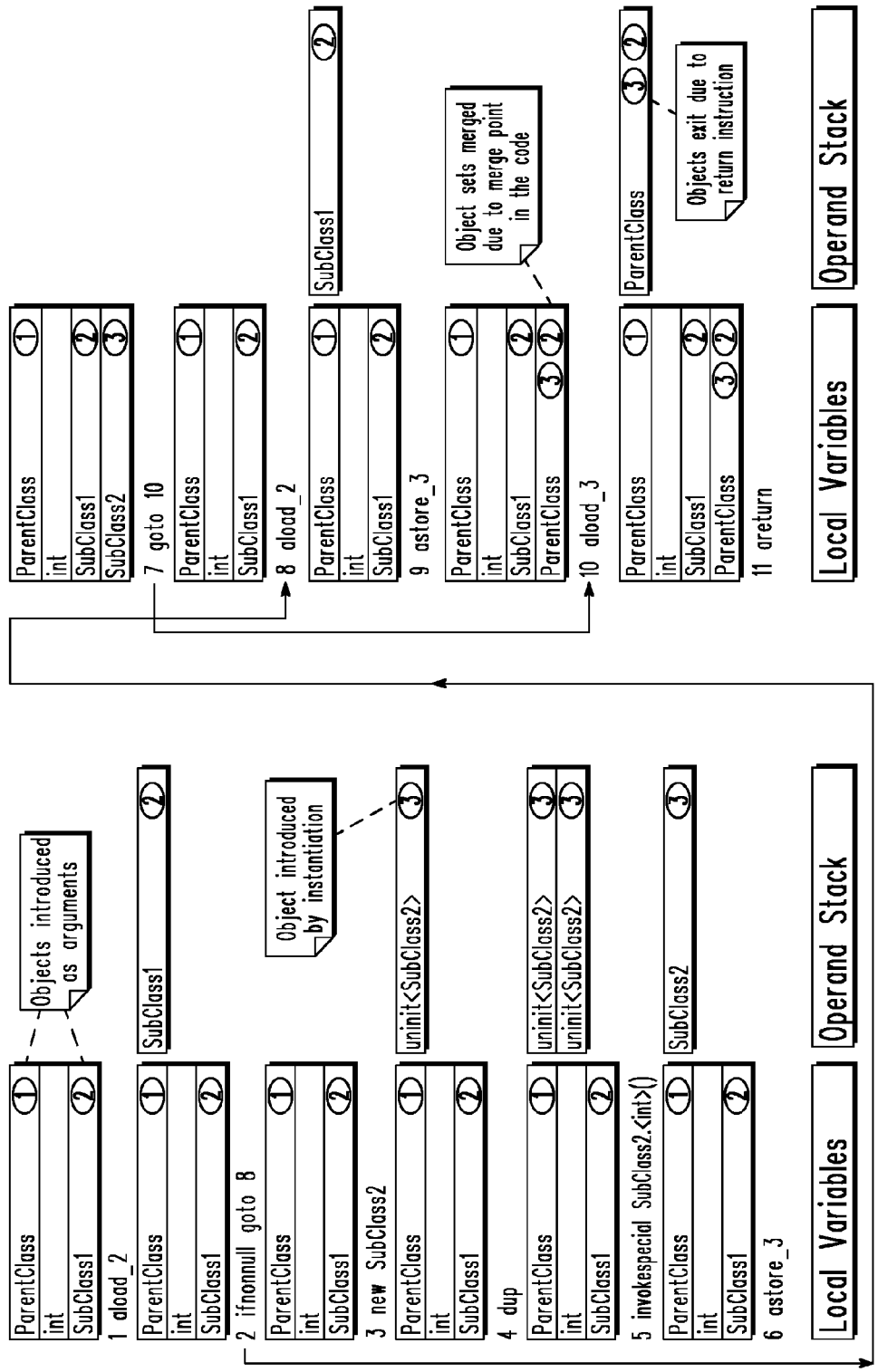
FIG. 2 illustrates an exemplary flow of the execution of instructions and the path of objects within a given method, in accordance with various embodiments disclosed herein.

This methodology is illustrated by considering method ParentClass.aMethod represented by the following Java™ code and the intra-procedural flow analysis illustrated in FIG. 2:

```
ParentClass aMethod(int i, SubClass1 arg) {
    ParentClass var;
    if(arg==null) var=new SubClass2( )
    else var=arg;
    return var;
}
```

Referring now to FIG. 2, the data structures resulting from the intra-procedural analysis described for method ParentClass.aMethod are illustrated. The java code has been compiled into eleven java bytecode instructions. There is a set of local variable array slots on the left side and operand stack slots on the right side for each Java™ bytecode instruction in this method. Each local variable slot and operand stack slot maintains a set which will contain the objects that can populate the slot. Object 1 has type ParentClass and is represented by reference number 1 in the figure; Object 2 has type SubClass1 and is represented by reference number 2; Object 3 has type SubClass2 and is represented by reference number 3. It can be seen that there are 11 indices in the drawing.

At aload_2 at index 1, objects 1 and 2 are introduced as arguments to the local variable array. For instruction dup at index 4 it can be seen that object 3 is introduced by instantiation to the operand stack. Because of the merge at the aload_3 at index 9 into the instruction array, the aload_3 instruction and the following instructions will be visited twice, and the contents of the local variable at index 3 will be merged. Thus, three objects are created. Two objects are created at initialization corresponding to the method parameters. The third object is created only by the instantiating instruction. Furthermore, scanning the method shows that the only instructions that can send objects outside the method are the method invocation instruction at index 4, which sends object 3 to the constructor (the init method) of SubClass2, and the return instruction at index 10, which sends both objects 2 and 3 to calling methods.

It has been mentioned that the embodiments described herein are not limited to Java™. For languages other than Java™, the methodology that analyzes the state of the registers/stack/local variables can be modified to contain sets having lists of objects that can exist at each object location.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for analysis of object flow during execution of individual instructions of a method, comprising once per the method:

invoking a method of an object-oriented application;

for each instruction of a plurality of instructions of the method modeling the effect of each instruction on a local variable array and an operand stack, the modeling further comprising:

determining a representation for the state of a plurality of local variables of a local variable array and of an operand stack at a current instruction of the plurality of instructions, wherein the state of the representation comprises a set of objects permitted to exist at each operand stack slot of a plurality of operand stack slots of the operand stack and at each local variable slot of a plurality of local variable slots of the local variable array for the current instruction;

determining successor instructions of the plurality of instructions that can follow the current instruction;

following execution of the current instruction, merging the state of the representation of the operand stack and the local variable array into each of the successor instructions, wherein if a successor instruction of the plurality of successor instructions has been previously executed further comprising merging each set of objects of the current instruction with the corresponding set of objects of the successor instruction to create a merged set of objects of the successor instruction; and iteratively repeating modeling the effect of each instruction of the plurality of instructions on the local variable array and the operand stack until the states of the local variable array and the operand stack at each instruction of the plurality of instructions converge to a final state, wherein for each set of objects that exist at each operand stack slot of the plurality of operand stack slots of the operand stack and for each set of objects that exists at each local variable slot of the plurality of local variable slots of the local variable array when the states of the local variable array and the operand stack converge, an object of the set of objects is mapped to an instruction of the plurality of instructions where the object was introduced to the method.

* * * * *